US011434357B2

United States Patent
Bancroft et al.

(10) Patent No.: US 11,434,357 B2
(45) Date of Patent: Sep. 6, 2022

(54) EXPANDABLE POLYMER PARTICLES

(71) Applicants: Dow Global Technologies LLC, Midland, MI (US); Rohm and Haas Company, Collegeville, PA (US)

(72) Inventors: Patricia Ansems Bancroft, Lake Jackson, TX (US); Matthew Carter, Bala Cynwyd, PA (US); Ibrahim Eryazici, Phoenixville, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 202 days.

(21) Appl. No.: 16/765,675

(22) PCT Filed: Feb. 15, 2019

(86) PCT No.: PCT/US2019/018140
§ 371 (c)(1),
(2) Date: May 20, 2020

(87) PCT Pub. No.: WO2019/164754
PCT Pub. Date: Aug. 29, 2019

(65) Prior Publication Data
US 2020/0377712 A1 Dec. 3, 2020

Related U.S. Application Data

(60) Provisional application No. 62/633,219, filed on Feb. 21, 2018.

(51) Int. Cl.
*C08L 33/08* (2006.01)
*C08J 9/20* (2006.01)

(52) U.S. Cl.
CPC .......... *C08L 33/08* (2013.01); *C08J 9/20* (2013.01); *C08J 2333/08* (2013.01); *C08J 2433/08* (2013.01)

(58) Field of Classification Search
CPC ......... C08L 33/08; C08J 9/20; C08J 2333/08; C08J 2433/08
See application file for complete search history.

(56) References Cited

U.S. PATENT DOCUMENTS 8,686,096 B2   4/2014   Deetz et al.
8,722,751 B2   5/2014   Scherble et al.
2013/0065976 A1   3/2013   Morita et al.
2013/0085192 A1   4/2013   Yamauchi et al.
2015/0361236 A1*   12/2015   Richter ................ C08F 2/44
                                                                521/94

FOREIGN PATENT DOCUMENTS

| EP | 1764374 | 3/2007 |
| JP | 11147971 | 6/1999 |
| JP | 1999147971 | 6/1999 |
| JP | 2004043732 A * | 2/2004 |
| JP | 2004043732 A * | 2/2004 |
| JP | 2013237779 | 11/2013 |
| JP | 05991851 B2 | 9/2016 |
| WO | 2017141653 | 8/2017 |

OTHER PUBLICATIONS

I. Eryazici; M. Carter; W. Sattler; J. Yang; S. Wills; F. J. Huby et al. Gas-Generating Polymer Particles: Reducing the Decomposition Temperature of Poly(tert-Butyl Methacrylate) Side Chains Using an Encapsulated Acid Catalyst Approach. ACS Appl. Polym. Mater. 2020, 2, 11, 5179-5187 (Year: 2020).*

* cited by examiner

*Primary Examiner* — Michael M Dollinger
*Assistant Examiner* — Christina H. W. Rosebach
(74) *Attorney, Agent, or Firm* — Reid S. Willis

(57) ABSTRACT

The present invention relates to a composition comprising an aqueous dispersion of first polymer particles functionalized with structural units of t-butyl methacrylate or t-butyl acrylate, and imbibed with a catalyst of Structure (I), where R, $R^1$, $R^2$ and $R^3$ are as defined herein, and a process for making the composition. The present invention also relates to an aqueous dispersion of core-shell polymer particles, wherein the first polymer particles are encapsulated in a shell having a high $T_g$. The imbibed first polymer particles and the core-shell polymer particles can be expanded in the dry state at significantly lower temperatures than reported in the prior art.

9 Claims, No Drawings

EXPANDABLE POLYMER PARTICLES

BACKGROUND OF THE INVENTION

The present invention relates to an aqueous dispersion of polymer particles functionalized with groups capable of forming an expansion gas, and a process for preparing the dispersion.

Thermally expandable polymer particles having diameters in the range of 100 nm to 50 μm are useful in applications requiring light-weight materials, insulation, and foaming. The preparation of thermally expandable particles by way of pyrolysis and in situ gas-generation of a polymer particle is described, for example, in JP 11147971A, JP 05991851B2, and US 2015/0361236. These publications disclose particles comprising a polymeric core bearing pyrolyzable side-chain groups and encapsulated within a polymeric shell of low gas permeability; when these particles are heated to temperatures in the range of 180° C. to 250° C. in the dry state, the polymeric core releases a gas that causes particle expansion.

The high temperatures required to release the expansion gas necessitate the input of significant amounts of energy as heat, thereby restricting the use of thermally expandable particles in applications (e.g., foaming) that are adversely affected at these temperatures. Moreover, the ability to release the expansion gas at a lower temperature would reduce energy cost and give rise to a wider selection of the types of monomers that could be used to prepare the polymeric shell. Accordingly, it would be advantageous to find a way to prepare thermally expandable polymer particles at significantly lower temperatures in the dry state.

SUMMARY OF THE INVENTION

The present invention addresses a need in the art by providing, in a first aspect, a composition comprising an aqueous dispersion of first polymer particles functionalized with structural units of t-butyl methacrylate or t-butyl acrylate, and imbibed with from 0.1 to 10 weight percent, based on the weight of the first polymer particles, of a catalyst of Structure I:

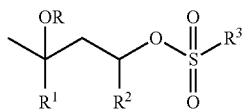

where R is H, $C_1$-$C_6$-alkyl; or $C(O)C_1$-$C_6$-alkyl; $R^1$ is H or $C_1$-$C_6$-alkyl; $R^2$ is H or $CH_3$; and $R^3$ is $C_1$-$C_{18}$-alkyl, phenyl-$(R^{3a})_b$, or benzyl-$(R^{3a})_b$, where b is 0, 1, 2, or 3; and each $R^{3a}$ is independently methyl, halo, methoxy, cyano, nitro, trifluoromethyl, or acetylamino; wherein the first polymer particles have an average particle size diameter in the range of from 100 nm to 500 μm, and a solids content in the range of from 10 to 60 weight percent, based on the weight of the aqueous dispersion of the first polymer particles.

In a second aspect, the present invention is a composition comprising an aqueous dispersion of core-shell polymer particles, wherein the core is functionalized with structural units of t-butyl methacrylate or t-butyl acrylate; and the shell has a calculated $T_g$ in the range of from 70° C. to 150° C.; wherein the polymer particles are imbibed with from 0.1 to 10 weight percent, based on the weight of the polymer particles, of a catalyst of Structure I:

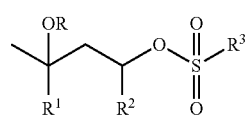

where R is H, $C_1$-$C_6$-alkyl; or $C(O)C_1$-$C_6$-alkyl; $R^1$ is H or $C_1$-$C_6$-alkyl; $R^2$ is H or $CH_3$; and $R^3$ is $C_1$-$C_{18}$-alkyl, phenyl-$(R^{3a})_b$, or benzyl-$(R^{3a})_b$, where b is 0, 1, 2, or 3; and each $R^{3a}$ is independently methyl, halo, methoxy, cyano, nitro, trifluoromethyl, or acetylamino; wherein the first polymer particles have an average particle size diameter in the range of from 100 nm to 500 μm, and a solids content in the range of from 10 to 60 weight percent, based on the weight of the aqueous dispersion of first polymer particles.

In a third aspect the present invention is a process comprising the steps of:

1) polymerizing, by emulsion or suspension polymerization, t-butyl methacrylate or t-butyl acrylate in water to form an aqueous dispersion of first polymer particles functionalized with structural units of t-butyl methacrylate or t-butyl acrylate;

2) incorporating into the polymer particles the catalyst of Structure I; wherein the catalyst is incorporated either a) in situ during the polymerization of the monomer emulsion or suspension, or b) by contacting the aqueous dispersion of polymer particles with the catalyst and transporting the catalyst into the first polymer particles;

wherein the first polymer particles have an average particle size diameter in the range of from 100 nm to 500 μm, and a solids content in the range of from 10 to 60 weight percent, based on the weight of the aqueous dispersion of the first polymer particles. The present invention addresses a need in the art by providing an aqueous dispersion of polymer particles that can undergo thermal expansion in the dry state at temperatures considerably lower than similar dispersions known in the art.

DETAILED DESCRIPTION OF THE INVENTION

In a first aspect, the present invention is a composition comprising an aqueous dispersion of first polymer particles functionalized with structural units of t-butyl methacrylate or t-butyl acrylate, and imbibed with from 0.1 to 10 weight percent, based on the weight of the first polymer particles, of a catalyst of Structure I:

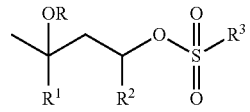

where R is H, $C_1$-$C_6$-alkyl; or $C(O)C_1$-$C_6$-alkyl; $R^1$ is H or $C_1$-$C_6$-alkyl, preferably $CH_3$; $R^2$ is H or $CH_3$; and $R^3$ is $C_1$-$C_{18}$-alkyl, phenyl-$(R^{3a})_b$, or benzyl-$(R^{3a})_b$, where b is 0, 1, 2, or 3; and each $R^{3a}$ is independently methyl, halo, methoxy, cyano, nitro, trifluoromethyl, or acetylamino; wherein the first polymer particles have an average particle size diameter in the range of from 100 nm to 500 μm, and a solids content in the range of from 10 to 60 weight percent, based on the weight of the aqueous dispersion of the first polymer particles.

As used herein, the term "structural unit" of the named monomer, refers to the remnant of the monomer after polymerization. For example, a structural unit of t-butyl methacrylate is illustrated by the following structure:

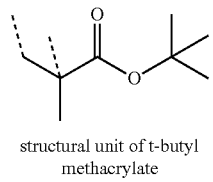

structural unit of t-butyl
methacrylate

Average particle size diameters are determined by different methods, depending on the size of the particles. For particles having diameters in the range of from 100 nm to 1.1 μm, particle size refers to Z-average particle size ($D_z$); for particles having a particle size in the range of greater than 1.1 μm to 30 μm, particle size refers to median weight ($D_{50}$) particle size as measured by Disc Centrifuge Photosedimentometry. Average particles size for particles greater than 30 μm refers to $D_{50}$ particle size measured by laser diffraction.

The first polymer particles are preferably functionalized with from 1 to 100, more preferably to 99 weight percent structural units of t-butyl methacrylate or t-butyl acrylate. Preferably, the first polymer particles further comprise from 1, more preferably from 5, to preferably 99, more preferably to 50, and most preferably to 20 weight percent structural units of one or more ancillary monoethylenically unsaturated nonionic monomers (other than t-butyl methacrylate or t-butyl acrylate), examples of which include $C_1$-$C_{20}$ alkyl esters of acrylic acid and methacrylic acid such as methyl methacrylate, methyl acrylate, ethyl acrylate, n-butyl acrylate, n-butyl methacrylate, isobutyl methacrylate, 2-ethylhexyl acrylate, 2-propylheptyl acrylate, and hydroxyethyl methacrylate; vinyl benzenes such as styrene, α-methylstyrene, o-methylstyrene, p-methylstyrene, and t-butylstyrene; vinyl esters such as vinyl acetate and vinyl versatate; ethylenically unsaturated nitriles such as acrylonitrile and methacrylonitrile; ethylenically unsaturated amides such as acrylamide and methacrylamide; and vinylidene chloride.

The first polymer particles may also further comprise, based on the weight of the first polymer particles, from 0.05, more preferably from 0.1, to preferably 5, and more preferably 2 weight percent structural units of one or more monoethylenically unsaturated anionic monomers or salts thereof, examples of which include monoethylenically unsaturated carboxylic acids such as acrylic acid, methacrylic acid, and itaconic acid, and salts thereof and combinations thereof; monoethylenically unsaturated sulfonic acids such as 2-acrylamido-2-methylpropane sulfonic acid, vinyl sulfonic acid, 2-sulfoethyl acrylate, 2-sulfoethyl methacrylate, 3-sulfopropyl acrylate, 3-sulfopropyl methacrylate, sodium styrene sulfonate, and 2-propene-1-sulfonic acid, and salts thereof and combinations thereof; and phosphorus acid monomers such as 2-phosphoethyl methacrylate or a salt thereof, and an organophosphate of Structure II:

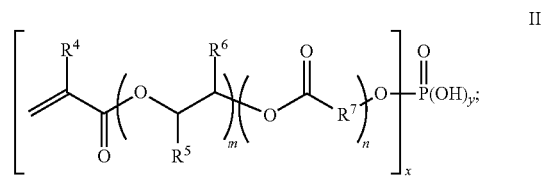

or a salt thereof; wherein $R^4$ is H or $CH_3$, wherein $R^5$ and $R^6$ are each independently H or $CH_3$, with the proviso that no two adjacent $CR^5CR^6$ groups are each substituted with methyl groups; each $R^7$ is independently linear or branched $C_2$-$C_6$ alkylene; m is from 2 to 10; n is from 0 to 5; x is 1 or 2; and y is 1 or 2; and x+y=3. Sipomer PAM-100, Sipomer PAM-200, Sipomer PAM-600, and Kayamer PM-21 phosphate esters are examples of commercially available compounds of within the scope of Formula II.

The first polymer particles may also be functionalized with multiethylenically unsaturated monomers such as divinyl benzene, allyl methacrylate, trimethylolpropane triacrylate, and trimethylolpropane trimethacrylate may also be used, preferably in the range of from 0.1 to 5 weight percent, based on the weight of the core.

The first polymer particles are imbibed with from 0.1, preferably from 0.2, and more preferably from 0.5 weight percent, to 10, preferably to 5 weight percent of the catalyst of Structure I:

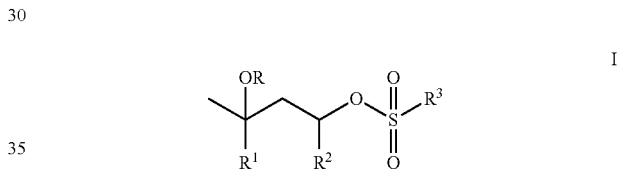

R is preferably H, $CH_3$, or $C(O)CH_3$, more preferably H; $R^1$ is preferably $CH_3$; and $R^3$ is preferably phenyl, o-methylphenyl, p-methylphenyl, o-methoxyphenyl, or p-methoxyphenyl. As used herein, "imbibed" means that the catalyst of Structure I is incorporated into the first polymer particles in the stated concentration range. Incorporation of the catalyst of Structure I into the first polymer particles is advantageously accomplished in situ by contacting the catalyst with a monomer emulsion comprising t-butyl methacrylate or t-butyl acrylate and optionally one or more ancillary ethylenically unsaturated monomers under emulsion or suspension polymerization conditions. Incorporation of the catalyst of Structure I into the first polymer particles may also be accomplished by contacting the dispersion of first polymer particles with the catalyst, preferably as an aqueous emulsion, and transporting the catalyst into the first polymer particles using vigorous mixing.

Dispersions of particles in the range of 100 nm to 500 μm can be prepared by a variety of known methods; for example, particles with diameters of 500 μm can be prepared as described in US 2015/0361236 A1 and U.S. Pat. No. 8,722,751 B2. Preferably the first particles have a $D_{50}$ particle size diameter in the range of from greater than 1.1 μm to 30 μm, more preferably to 10 μm.

In a second aspect, the present invention is a composition comprising and aqueous dispersion of core-shell polymer particles imbibed with the catalyst of Structure I, wherein the shell has a glass transition temperature ($T_g$), as calculated by the Fox equation, in the range of from 70° C., preferably from 100° C., to 150° C. In one embodiment of this aspect of the invention, the first polymer particles become the cores of the core-shell polymer particles. In this embodiment, the aqueous dispersion of core-shell polymer particles is advantageously prepared by contacting the aqueous dispersion of first polymer particles imbibed with the catalyst of Structure I with one or more shell monomers under emulsion polymerization conditions to form a polymer shell encapsulating the core.

Suitable shell monomers are those capable of forming a shell having a $T_g$, as calculated by the Fox equation, in the range of from 70° C. to 150° C. The makeup of the shell monomers necessarily includes one or more monomers whose homopolymers have a $T_g$ of at least 70° C. (high $T_g$ monomers) but may also include one or monomers whose homopolymers have a $T_g$ of less than 70° C. (low $T_g$ monomers), provided that the $T_g$ of the copolymer that forms the shell has a $T_g$ in the prescribed range.

Examples of suitable high $T_g$ shell monomers include vinyl benzenes; ethylenically unsaturated nitriles; ethylenically unsaturated amides; isobornyl methacrylate, cyclohexyl methacrylate, N-phenyl maleimide, and methyl methacrylate; examples of low $T_g$ monomers that may be used in combination with the high $T_g$ monomers include vinylidene chloride, ethyl acrylate, butyl acrylate, butyl methacrylate, hydroxyethyl methacrylate, and 2-ethylhexyl methacrylate. Preferably, the shell comprises structural units of one or monomer high $T_g$ monomers selected from the group consisting of styrene, methyl methacrylate, acrylonitrile, and methacrylonitrile; and structural units of the low $T_g$ monomer vinylidene chloride.

Multiethylenically unsaturated monomers may also be used, preferably in the range of from 0.1 to 5 weight percent, based on the weight of the shell. The weight-to-weight ratio of the shell to the core is preferably in the range of from 1:100 to 200:1.

In another embodiment of the second aspect of the present invention, the catalyst of Structure I may be loaded during the shell polymerization stag; in this embodiment, the catalyst may be introduced in the first stage and the second stage or just the second stage.

The core-shell polymer particles are designed to undergo particle expansion, which can be measured by first placing a diluted solution of the dispersion of polymer particles onto a substrate, then allowing water to evaporate to provide dried and spatially separated core-shell polymer particles, then heating the substrate to a sufficient temperature and for a sufficient time to expand the core-shell polymer particles.

In a third aspect the present invention is a process comprising the steps of:

1) polymerizing, by emulsion or suspension polymerization, t-butyl methacrylate or t-butyl acrylate in water to form an aqueous dispersion of first polymer particles functionalized with structural units of t-butyl methacrylate or t-butyl acrylate;

2) incorporating into the polymer particles the catalyst of Structure I; wherein the catalyst is incorporated either a) in situ during the polymerization of the monomer emulsion or suspension, or b) by contacting the aqueous dispersion of polymer particles with the catalyst and transporting the catalyst into the first polymer particles;

wherein the first polymer particles have an average particle size diameter in the range of from 100 nm to 500 µm, and a solids content in the range of from 10 to 60 weight percent, based on the weight of the aqueous dispersion of the first polymer particles.

Water is advantageously removed from either the dispersion of first polymer particles or the dispersion of core-shell polymer particles to form dried polymer particles, which undergo expansion when heated at a temperature in the range of from 130° C. to 150° C.

It has been discovered that the presence of the catalyst of Structure I in the core (alternatively, the first polymer particles) provides a pathway for release of an expansion gas (isobutylene) from the core at a decomposition temperature in the range of from 130° C. to 150° C. In contrast, release of the expansion gas has been demonstrated to occur at 190° C. or higher without the inclusion of the catalyst. The presence of the imbibed catalyst reduces the amount of energy as heat required to cause expansion. The inclusion of the catalyst of Structure I in the first polymer particles (or the core of the core-shell polymer particles) provides a mechanism for using the dispersion of particles in applications that require the in situ generation of expansion gas, with concomitant expansion of particles, at temperatures substantially lower than the current expandable particles previously described. For example, the density of paperboard incorporated with the expandable particles imbibed with the catalyst of Structure I can be reduced to create a light-weight material by subjecting the paperboard to temperatures not exceeding the temperature limitations of the drier sections of the paper making machine.

Malvern Particle Sizing Method

Particle sizes up to 1.1 µm were measured using a Malvern Zetasizer Nano ZS90 Analyzer, which measures Z-average particle size ($D_z$) using dynamic light scattering (DLS) at a scattering angle of 90° using Zetasizer software version 7.11. A drop of the dispersion was diluted using an aqueous solution of 0.01 M NaCl (in ultrapure water, type 1, ISO 3696), and further diluted as needed to achieve a particle count in the range of 100-400 thousand counts/s (Kcps). Particle size measurements were carried using instrument's particle sizing method and $D_z$ was computed by the software. $D_z$ is also known as the intensity-based harmonic mean average particle size and expressed as;

$$D_z = \frac{\Sigma S_i}{\Sigma(S_i/D_i)}$$

Here, $S_i$ is scattered intensity from particle i with diameter $D_i$. Detailed $D_z$ calculations are described in ISO 22412: 2017 (Particle size analysis-Dynamic light scattering (DLS)).

Microscopy Particle Sizing Method for Unexpanded and Expanded Particles

For particles having diameters in the range of from 1.1 µm to 30 µm, a diluted aqueous solution of polymer particles was deposited on a standard glass microscope slide. The water was allowed to evaporate to give dried and spatially separated particles, which were imaged with a Leitz Orthoplan Trinocular Microscope equipped with an Evolution VF Monochrome camera. A drop of an immersion oil (Type A, Cargille) was placed on the dried sample and a glass coverslip was placed onto the droplet of oil; a second drop of oil was placed onto the glass coverslip and a third droplet onto on the condenser lens of the microscope. Images were collected using a Zeiss 100× oil-immersion lens using Q-Capture software (version 2.9.13). Images were then processed using ImageJ software (version 1.50i, NIH, USA).

The image scale in ImageJ was set as 21.27 pixel/μm (as determined previously from the image of a stage micrometer of known dimensions under the same imaging conditions). The diameters of a minimum of ten representative particles were measured manually using ImageJ's measure function. An average of the measurements was recorded to determine the average particle diameter.

DCP Particle Sizing Method $D_{50}$ particle diameters (from 1.1 μm to 30 μm) were measured using a Disc Centrifuge Photosedimentometer (DCP, CPS Instruments, Inc., Prairieville, La.), which separates particle size modes by centrifugation and sedimentation through a sucrose gradient. Samples were prepared by adding 1 to 2 drops of a particle dispersion into 10 mL of deionized (DI) water containing 0.1% sodium lauryl sulfate, followed by injection of 0.1 mL of the sample into a spinning disc filled with 15 g of aqueous sucrose solution. A sucrose gradient on a spinning disc was established using two separate peristaltic pumps, where the first pump delivered a high sucrose concentration solution (8%) and the second pump delivered a low sucrose concentration solution (2%). The samples were applied to the disc spinning at 10,000 rpm, and a 596-nm polystyrene calibration standard was injected prior to the injection of the sample. The $D_{50}$ particle size was calculated using the instrument's algorithm.

Polymer Particle Powder Preparation and Decomposition Temperature Measurement by Thermogravimetric Analysis (TGA)

A dispersion of polymer particles (~5 g) was placed onto an aluminum pan and allowed to dry overnight under ambient conditions. The dried solids were ground using a mortar and pestle to provide a finely powdered material. A small amount of the powder (2-10 mg) was weighed into a TGA crucible on an analytical balance, and the sample weight loss was measured from 25° C. to 300° C. at a 5 C.°/min temperature ramp using a TA instruments model TGA Q5000 with Universal Analysis software V3.15 Build 263. The derivative of the weight loss profile as a function of temperature was generated using the instrument's algorithm, and the maximum of the derivative was taken as the decomposition temperature. This point corresponds to the maximum mass loss rate during heating.

Molecular Weight Determination of Acrylic Oligomer Seed

A dispersion of the acrylic oligomer seed (~0.1 g) was dissolved in tetrahydrofuran (THF, ~8 g, HPLC grade) and filtered through 0.45 μm PTFE filter. Size Exclusion Chromatography (SEC) was carried out on a liquid chromatograph equipped with an Agilent 1100 Model isocratic pump, a vacuum degasser, a variable injection size autosampler, and an Agilent 1100 HPLC G1362A Refractive Index detector. Data was processed with Agilent ChemStation, version B.04.03 and Agilent GPC-Addon version B.01.01. SEC separations were carried out at 40° C. using THF as the eluent at a flow rate of 1 mL/min using an SEC column set composed of two PLgel Mixed D columns (300×7.5 mm ID, 5 μm), and a guard column (50×7.5 mm ID, 5 μm).

The instrument was calibrated using ten narrow molecular weight polystyrene standards and fitted with a $1^{st}$ order calibration curve. The weight average molecular weights ($M_w$ in Daltons) of the standards were as follows: 630; 1,370; 2,930; 4,900; 10,190; 22,210; 50,550; 111,400; 214,700; and 363,600.

EXAMPLES

Comparative Example 1—Preparation of an Aqueous Dispersion of t-BMA Functionalized Polymer Particles without Catalyst A monomer emulsion (ME) was prepared in a vessel by combining deionized water (87.5 g), ammonium nonoxynol-4-sulfate (Triton XN-45S, 1.2 g, 60% active in ethanol), $NH_4OH$ (0.2 g, 28% aq. solution), t-butyl methacrylate (t-BMA, 217.0 g), and n-butyl acrylate (n-BA, 45.4 g). Separately, deionized water (600 g) was added to a 4-neck 2-L round bottom reactor fitted with an overhead stirrer, a condenser, and thermocouple. The reactor was heated to 87° C., after which time ammonium persulfate solution (APS, 1.5 g in 15 g water) and the acrylic polymer seed (52 n-BA/46.5 methyl methacrylate (MMA)/1.5 methacrylic acid (MAA) 13.0 g, 44.7% active, 95 nm Z-average diameter as measured by DLS) were added to the reactor. The ME and a separately prepared APS solution (0.42 g in 49 g water) were fed concurrently into the reactor over 140 min while maintaining the reactor temperature at 83° C. Upon completion of addition of the feeds, the reactor temperature was maintained at 82° C. for 30 min, and then cooled to 35° C. The resultant dispersion was filtered through a 45-μm screen. The filtrate was analyzed for percent solids (24.1%) and the Z-average particle size was determined to be 328 nm, as measured DLS. The decomposition temperature of the powdered material was 191° C., as measured by the TGA method described hereinabove.

Comparative Example 2—Preparation of an Aqueous Dispersion t-BMA Functionalized Polymer Particles without Catalyst A monomer emulsion (ME) was prepared in a vessel by combining deionized water (187.5 g), Triton XN-45S (1.7 g, 60% active in ethanol), Solvay Sipomer PAM-200 phosphate esters of PPG monomethacrylate (PAM-200, 5.8 g, 97% active), t-BMA, (500.0 g), and n-BA (56.0 g). Deionized water (900.0 g) was added to a 4-neck, 5-L round reactor fitted with an overhead stirrer, condenser, and thermocouple. The reactor was heated to 93° C., after which time APS (2.3 g in 25.0 g water) and an acrylic polymer (83 t-BMA/13 n-BA/4 PAM-200, 300 g, 22.7% active, 336 nm Z-average particle size as measured by DLS) was added to the reactor. The ME and a separately prepared APS solution (0.8 g in 130 g water) were fed concurrently into the reactor over 140 min while maintaining the reactor temperature at 84° C. Upon completion of the addition of the feeds, $NH_4OH$ (1.4 g, 28% aq.) was added to the reactor and the reactor temperature was maintained at 82° C. for 30 min, and then cooled to 35° C. The resultant dispersion was filtered through a 150-μm screen. The filtrate was analyzed for percent solids (28.2%) and the Z-average particle size was determined to be 678 nm by DLS. The decomposition temperature of the dried and powdered material was 190° C., as measured by TGA.

Comparative Example 3—Preparation of an Aqueous Dispersion of t-Butyl Acrylate Functionalized Polymer Particles without Catalyst An aqueous dispersion of acrylic oligomer seed (33% solids, 67 n-BA/18 n-dodecyl mercaptan/14.8 methyl methacrylate/0.2 methacrylic acid) with a Z-average particle size of 672 nm, as determined by DLS, and a weight average molecular weight of 2532 g/mole (as determined by the SEC method described hereinabove) was prepared as described in U.S. Pat. No. 8,686,096, Examples 1 and 5 (col. 19 and 20).

An emulsion of initiator was prepared by combining DI water (2.5 g), Polystep A-16-22 branched alkylbenzene sulfonate (A-16-22, 0.15 g, 22.0% aq. solution), 4-hydroxy 2,2,6,6-tetramethylpiperidine (4-hydroxy-TEMPO, 0.2 g), and t-amyl peroxy-2-ethylhexanoate (TAPEH, 3.50 g, 98% active), followed by homogenization at 15,000 rpm for 10 min. The initiator emulsion was then added to a pre-weighed dispersion of the acrylic oligomer seed (15.0 g, 32.4% solids) in a vessel, and the contents were mixed for 70 min. A monomer emulsion (ME) was prepared in a separate vessel by combining deionized water (125.0 g), hydroxyethyl cellulose QP-3L (QP-3L, 3.0 g, 99% active), PAM-200 (3.0 g, 97% active), A-16-22 (4.8 g, 22.0% solution), 4-hydroxy-TEMPO (0.2 g), t-butyl acrylate (t-BA, 291.0 g), and allyl methacrylate (ALMA, 6.0 g). Deionized water (1575 g) was added to a 4-neck, 5-L round bottom reactor fitted with an overhead stirrer, condenser, and thermocouple. The reactor was heated to 70° C., after which time the initiator/oligomer seed mixture was added to the reactor. The ME was then fed into the reactor over 17 min. After an induction period of 82 min, a resulting exotherm caused the reactor temperature to rise to a maximum temperature of 80° C. The reactor temperature was then increased to 85° C. and maintained for 30 min, followed by cooling to 30° C. The resultant dispersion was filtered through a 45-µm screen. The filtrate was analyzed for percent solids (13.5%) and a $D_{50}$ particle size was found to be 2.8 µm, as measured by DCP. The decomposition temperature of the dried and powdered material was 194° C., as measured by TGA.

Example 1—Preparation of t-BMA Functionalized Particles with 1% Catalyst 1

A monomer emulsion (ME) was prepared in a flask by combining deionized water (94.0 g), A-16-22 (1.9 g, 22.0% aq. solution), PAM-200 (2.7 g, 97% active), t-BMA (231.0 g), n-BA (25.5 g), and 3-hydroxy-3-methylbutyl 4-methylbenzenesulfonate (Catalyst 1, 2.7 g, 99% active). DI water (1200.0 g) and a solution of glacial acetic acid (0.8 g, 99.7% active in 15.0 g water) was added to a 4-neck, 5-L round bottom reactor fitted with an overhead stirrer, condenser, and thermocouple. The reactor was heated to 92° C., after which time NaPS (2.4 g in 25.0 g water) and an acrylic polymer seed as described in Comparative Example 2 (217.0 g, 28.2% active, 678 nm as measured by DLS) were added to the reactor. The ME and a separately prepared NaPS solution (0.6 g in 60.0 g water) were fed concurrently into the reactor over 70 min while maintaining the reactor temperature at 85° C. Upon completion of addition of the cofeeds, the reactor temperature was maintained at 85° C. for 30 min, and then cooled to 30° C. The resultant dispersion was filtered through a 45-µm screen. The filtrate was analyzed for percent solids (15.6%) and Z-average particle size was determined to be 804 nm by DLS. The decomposition temperature of the dried powdered material was 142° C., as measured by TGA.

Example 2—Preparation of t-BMA Functionalized Particles with 2% Catalyst 1

A monomer emulsion (ME) was prepared in a vessel by combining DI water (43.8 g), A-16-22 (1.1 g, 22.0% aq. solution), PAM-200 (0.7 g, 97% active), t-BMA (120.7 g), n-BA (13.1 g), and Catalyst 1 (2.8 g, 99% active). DI water (190.0 g) was added to a 4-neck, 1-L round bottom reactor fitted with an overhead stirrer, condenser, and thermocouple. The reactor was heated to 70° C., and then a solution of $FeSO_4.7H_2O$ (5.0 g, 0.15% aq solution) and an acrylic polymer seed (89.5 t-BMA/10 n-BA/0.5 PAM-200, 119.0 g, 29.7% active, 563 nm as measured by DLS) was added to the reactor. The ME, and separately prepared solutions of t-butyl hydroperoxide solution (t-BHP, 0.7 g (70% aq.) in 35.0 g water) and isoascorbic acid (IAA, 0.5 g in 35.0 g water) were fed concurrently into the reactor over 130 min while maintaining the reactor temperature at 70° C. Upon completion of the addition of the cofeeds, the reactor was cooled to 30° C. The resultant dispersion was filtered through a 45-µm screen. The filtrate was analyzed for percent solids (27.8%) and the Z-average particle size was determined to be 933 nm by DLS. The decomposition temperature of the dried and powdered material was 147° C. by TGA.

Example 3—Preparation of t-BMA Functionalized Particles with 2% Catalyst 2

An emulsion of catalyst was prepared in a 1-oz glass vial equipped with a stir bar by combining DI water (0.2 g), octoxynol-40 (Triton X-405, 0.15 g, 70.0% aq. solution), and 2,4-pentanediol, 2-methyl-, 4-(4-methylbenzenesulfonate) (Catalyst 2, 1.0 g, 90% active), followed by vigorous mixing. A small amount of the catalyst emulsion (0.11 g) was added to a portion of the particle dispersion prepared in Comparative Example 1 (15.0 g) and the mixture was agitated on a rotating shaker for 1 h. The resulting mixture was dried overnight at room temperature and the decomposition temperature of the powdered material was 146° C. by TGA.

Example 4—Preparation of t-Butyl Acrylate Functionalized Particles with 3% Catalyst 2

A small amount of the catalyst emulsion described in Example 3 (0.25 g) was added to a portion of the dispersion obtained in Comparative Example 3 (35.0 g) and the resulting mixture was agitated on a rotating shaker for 1 h. The resulting mixture was dried overnight at room temperature and the decomposition temperature of the powdered material was 138 C by TGA.

Example 5—Preparation of Core/Shell Particles with 2% Catalyst 1

A monomer emulsion (ME) was prepared in a vessel by combining DI water (11.0 g), A-16-22 (0.7 g, 22.0% aq. solution), sodium laureth-12-sulfate (FES-993, 0.2 g, 30% active), styrene (31.0 g), acrylonitrile (10.5 g), and divinylbenzene (0.25 g, 85% active). DI water (200.0 g) was added to a 4-neck, 1-L round-bottom reactor fitted with an overhead stirrer, condenser, and thermocouple. The reactor was heated to 70° C., after which time $FeSO_4.7H_2O$ (1.2 g, 0.15% aq. solution) and a portion of the dispersion prepared in Example 2 (150.0 g, 27.8% active) was added to the reactor. The ME and separately prepared solutions of t-BHP (0.3 g (70% aq.) in 30.0 g water) and IAA (0.2 g in 30.0 g water) were fed concurrently into the reactor over 90 min while maintaining the reactor temperature at 70° C. Upon completion of the addition of the cofeeds, a second monomer emulsion was prepared in a 1-oz glass vial by combining DI water (1.7 g), A-16-22 (0.1 g, 22.0% aq. solution), and styrene (6.2 g), followed by vigorous mixing. This second monomer emulsion was added to the reactor; after 5 minutes, t-BHP (0.5 g (70% aq.) in 20.0 g water) and IAA (0.3 g in 20.0 g water) were fed concurrently into the reactor over 35 min while maintaining reactor temperature at 70° C. Upon completion of addition of the cofeeds, the reactor was cooled to 30° C. The resultant dispersion was filtered through a 45-μm screen. The filtrate was analyzed for percent solids (14.2%) and Z-average particle size (1.1 μm by DLS).

Example 6—Expansion of Example 5 Particles

One drop (~10 μL) of the dispersion prepared as described in Example 5 was diluted with 15 mL of DI water. A drop of the diluted dispersion was placed onto a standard microscope glass slide and allowed to dry at ambient temperature for ~1 h. The average diameter of the dried particles was 1.2±0.1 μm by the Microscopy Particle Sizing Method described hereinabove. A slide containing dried particles was then placed onto an IKA hot plate pre-heated to a temperature sufficient to raise the temperature of the glass slide to 150° C., as measured using a thermal contact probe. Once the temperature of the glass slide reached 150° C., the glass slide was maintained at this temperature for 3 min, after which time the slide was removed and cooled to room temperature. The average diameter of the resulting particles was 1.8±0.1 μm by the Microscopy Particle Sizing Method.

What is claimed is:

1. An aqueous dispersion of first polymer particles functionalized with structural units of t-butyl methacrylate or t-butyl acrylate, and imbibed with from 0.1 to 10 weight percent, based on the weight of the first polymer particles, of a catalyst of Structure I:

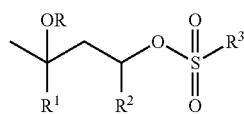

where R is H, $C_1$-$C_6$-alkyl; or $C(O)C_1$-$C_6$-alkyl; $R^1$ is H or $C_1$-$C_6$-alkyl; $R^2$ is H or $CH_3$; and $R^3$ is $C_1$-$C_{18}$-alkyl, phenyl-$(R^{3a})_b$, or benzyl-$(R^{3a})_b$, where b is 0, 1, 2, or 3;
and each $R^{3a}$ is independently methyl, halo, methoxy, cyano, nitro, trifluoromethyl, or acetylamino; wherein the first polymer particles have an average particle size diameter in the range of from 100 nm to 500 μm, and a solids content in the range of from 10 to 60 weight percent, based on the weight of the aqueous dispersion of the first polymer particles.

2. The composition of claim 1 wherein R is H; $R^1$ is $CH_3$; $R^3$ is phenyl, o-methylphenyl, p-methylphenyl, o-methoxyphenyl, or p-methoxyphenyl.

3. The composition of claim 1 wherein the first polymer particles further comprise from 1 to 99 weight percent structural units of one or more ancillary monoethylenically unsaturated nonionic monomers, wherein the polymer particles have a $D_{50}$ particle size in the range of from greater than 1.1 μm to 30 μm; wherein $R^3$ is phenyl, o-methylphenyl, or p-methylphenyl.

4. The composition of claim 3 wherein the first polymer particles further comprise from 0.1 to 5 weight percent, based on the weight of the first polymer particles, of structural units of a multiethylenically unsaturated monomer.

5. The composition of claim 1 wherein the first polymer particles are encapsulated in a polymeric shell having a $T_g$ in the range of from 70° C. to 150° C.

6. The composition of claim 5 wherein the encapsulating shell comprises structural units of one or more high $T_g$ monomers selected from the group consisting of vinyl benzenes, ethylenically unsaturated nitriles, ethylenically unsaturated amides, isobornyl methacrylate, cyclohexyl methacrylate, and methyl methacrylate; and at least one low $T_g$ monomer selected from the group consisting of vinylidene chloride, ethyl acrylate, butyl acrylate, butyl methacrylate, hydroxyethyl methacrylate, and 2-ethylhexyl methacrylate.

7. The composition of claim 6 wherein the encapsulating shell comprises structural units of one or more monomers selected from the group consisting of styrene, methyl methacrylate, acrylonitrile, and methacrylonitrile; and structural units of vinylidene chloride.

8. The composition of claim 7 wherein the encapsulating shell further comprises from 0.1 to 5 weight percent, based on the weight of the shell, of structural units of a multiethylenically unsaturated monomer.

9. A process comprising the steps of
1) polymerizing, by emulsion or suspension polymerization, t-butyl methacrylate or t-butyl acrylate in water to form an aqueous dispersion of first polymer particles functionalized with structural units of t-butyl methacrylate or t-butyl acrylate;
2) incorporating into the polymer particles a catalyst of Structure 1:

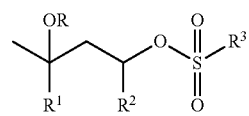

where R is H, $C_1$-$C_6$-alkyl; or $C(O)C_1$-$C_6$-alkyl; $R^1$ is $C_1$-$C_6$-alkyl; $R^2$ is H or $CH_3$; and
$R^3$ is $C_1$-$C_{18}$-alkyl, phenyl-$(R^{3a})_b$, or benzyl-$(R^{3a})_b$, where b is 0, 1, 2, or 3; and each
$R^{3a}$ is independently methyl, halo, methoxy, cyano, nitro, trifluoromethyl, or acetylamino; wherein the catalyst is incorporated either:
a) in situ during the polymerization of the monomer emulsion or suspension, or
b) by contacting the aqueous dispersion of polymer particles with the catalyst and transporting the catalyst into the first polymer particles;
wherein the first polymer particles have an average particle size diameter in the range of from 100 nm to 500 μm, and a solids content in the range of from 10 to 60 weight percent, based on the weight of the aqueous dispersion of the first polymer particles.

* * * * *